United States Patent
Ficken et al.

(10) Patent No.: US 11,338,355 B2
(45) Date of Patent: May 24, 2022

(54) METHOD FOR CHECKING A RIVET

(71) Applicant: Broetje-Automation GmbH, Rastede (DE)

(72) Inventors: Wilfried Ficken, Rastede (DE); Bernd-Michael Wolf, Rastede (DE)

(73) Assignee: Broetje-Automation GmbH, Rastede (DE)

( * ) Notice: Subject to any disclaimer, the term of this patent is extended or adjusted under 35 U.S.C. 154(b) by 507 days.

(21) Appl. No.: 15/308,918

(22) PCT Filed: May 4, 2015

(86) PCT No.: PCT/EP2015/059673
§ 371 (c)(1),
(2) Date: Nov. 4, 2016

(87) PCT Pub. No.: WO2015/169727
PCT Pub. Date: Nov. 12, 2015

(65) Prior Publication Data
US 2017/0056960 A1    Mar. 2, 2017

(30) Foreign Application Priority Data

May 6, 2014 (DE) .................. 10 2014 106 312.0

(51) Int. Cl.
*B21J 15/28* (2006.01)
*B21J 15/32* (2006.01)
(Continued)

(52) U.S. Cl.
CPC ............. *B21J 15/28* (2013.01); *B21J 15/32* (2013.01); *G01B 11/02* (2013.01); *G01B 11/08* (2013.01);
(Continued)

(58) Field of Classification Search
CPC ........ G01N 21/952; G06T 2207/30164; B07C 5/04; B21J 15/32
See application file for complete search history.

(56) References Cited

U.S. PATENT DOCUMENTS 4,762,261 A * 8/1988 Hawly .................... B21J 15/14
227/111
4,823,396 A * 4/1989 Thompson ................ B07C 5/10
382/152
(Continued)

FOREIGN PATENT DOCUMENTS

CN    102829726 A * 12/2012
CN    203037216     7/2013
(Continued)

OTHER PUBLICATIONS

Machine Translation of CN102829726 (Year: 2012).*
(Continued)

*Primary Examiner* — Jacob J Cigna
*Assistant Examiner* — Michael W Hotchkiss
(74) *Attorney, Agent, or Firm* — Pauly, DeVries Smith & Deffner LLC

(57) ABSTRACT

The disclosure relates to a method for checking a rivet, the rivet being transported from a rivet filling station along a transporting path in the direction of a riveting machine during operation of the riveting machine. The method is characterized in that the rivet is measured on the transporting path for determining a rivet geometry of the rivet. The disclosure similarly relates to a corresponding measuring arrangement for checking a rivet.

18 Claims, 4 Drawing Sheets

(51) Int. Cl.
  G01B 11/02 (2006.01)
  G06T 7/00 (2017.01)
  G01B 11/08 (2006.01)
  G06T 7/55 (2017.01)
  G01N 21/952 (2006.01)

(52) U.S. Cl.
  CPC .......... *G06T 7/0004* (2013.01); *G06T 7/0006* (2013.01); *G06T 7/55* (2017.01); *G01N 21/952* (2013.01); *G06T 2207/30164* (2013.01)

(56) References Cited

U.S. PATENT DOCUMENTS

| | | | | |
|---|---|---|---|---|
| 4,828,159 A * | 5/1989 | Woods | ............... | B21J 15/28 227/112 |
| 4,931,658 A * | 6/1990 | Tole | ............... | G01B 11/105 250/559.24 |
| 4,948,302 A * | 8/1990 | Tarling | ............... | B21J 15/28 406/17 |
| 5,150,623 A * | 9/1992 | Woods | ............... | B21J 15/28 73/865.8 |
| 5,383,021 A * | 1/1995 | Hanna | ............... | G01B 11/2425 250/559.26 |
| 5,727,300 A * | 3/1998 | Ekdahl | ............... | B21J 15/10 29/407.04 |
| 6,111,601 A * | 8/2000 | Adachi | ............... | G01B 11/2433 348/128 |
| 6,252,661 B1 * | 6/2001 | Hanna | ............... | G01B 11/2425 356/394 |
| 6,959,108 B1 * | 10/2005 | Bartelt | ............... | G06T 7/0004 382/141 |
| 7,134,210 B2 * | 11/2006 | Yeeles | ............... | G01B 5/204 33/199 B |
| 7,227,163 B2 * | 6/2007 | Johnson | ............... | G01N 21/8806 250/559.12 |
| 7,633,635 B2 * | 12/2009 | Nygaard | ............... | G06K 17/00 186/2 |
| 8,213,702 B2 * | 7/2012 | Yang | ............... | B07C 5/3422 382/141 |
| 8,237,935 B2 * | 8/2012 | Nygaard | ............... | G01B 11/2425 250/559.24 |
| 9,579,712 B2 * | 2/2017 | Schneider | ............... | B21J 15/28 |
| 2007/0079491 A1 | 4/2007 | Hader et al. | | |

FOREIGN PATENT DOCUMENTS

| | | | |
|---|---|---|---|
| DE | 3917310 | 11/1990 | |
| DE | 4310464 | 10/1994 | |
| DE | 19745728 | 4/1999 | |
| DE | 20215364 | 1/2003 | |
| DE | 20202799 | 7/2003 | |
| DE | 102005048325 | 4/2007 | |
| DE | 102007061803 | 6/2009 | |
| DE | 102007061803 B3 * | 6/2009 | ............ B21J 15/28 |
| DE | 202008014886 U1 * | 4/2010 | ............ B21J 15/14 |
| EP | 1772199 | 4/2007 | |
| SU | 1144951 | 3/1985 | |

OTHER PUBLICATIONS

Machine Translation of DE202008014886 (Year: 2010).*
Machine Translation of DE-102007061803-B3 (Year: 2009).*
"International Search Report and Written Opinion," for PCT/EP2015/059673, dated Jul. 22, 2015 (9 pages), English translation.
"Search Report," for German Patent Application No. 102014106312.0, dated Jan. 5, 2015 (8 pages), no translation available.

* cited by examiner

METHOD FOR CHECKING A RIVET

CROSS-REFERENCE TO RELATED APPLICATIONS

This application is a national stage application under 35 U.S.C. 371 of Inter-national Patent Application Serial No. PCT/EP2015/059673, entitled "Verfahren zum Prufen eines Niets," filed May 4, 2015, which claims priority from German Patent Application No. DE 10 2014 106 312.0, filed May 6, 2014 the disclosure of which is incorporated herein by reference.

FIELD OF THE TECHNOLOGY

The present disclosure relates to a method for checking a rivet and to a measuring arrangement for checking a rivet.

BACKGROUND

In the production of structural aircraft components, often a large number of riveted connections have to be produced, the production of these riveted connections increasingly being performed in an automated manner by riveting machines, which are supplied with rivets by a rivet filling station—likewise in an automated manner. At the same time, these riveted connections have to meet high quality requirements. In particular, rivet head projections or damage to the component caused by the riveting operation are to be avoided. These and other faults may occur in particular if the rivet is not sized correctly to match the bore into which it is to be set.

To be able to assess even before producing the riveted connection whether a rivet to be used is suitable with regard to its tolerances and batch variations for setting in a bore that similarly has tolerances, a measurement of the bore, and in particular of the countersink diameter, is performed. By comparing the bore with the rivet, it can be decided whether this specific rivet is to be used for this specific bore.

It is known from the prior art, and in particular from DE 10 2005 048 325 A1, on which the present disclosure is based, to check a rivet optically in the riveting finger of a riveting head. This involves examining the rivet with regard to its surface protection by its reflection behavior.

However, a disadvantage of this approach is that it is not possible to check the rivet geometry in the riveting head, or only insufficiently. This is so because the guidance of the rivet in the riveting finger means that often regions of the rivet that are to be checked, such as for instance at the transition between the countersink and the shank or the entire upper part of the shank, are concealed, so that as a result a sufficiently accurate optical examination is not possible in the riveting finger.

SUMMARY

An object of the disclosure is to develop and improve the possibility of checking a rivet before it is used in a riveting machine with regard to its suitability for a specific bore with regard to accuracy and speed.

Essential is the realization that the checking of the rivet can be performed on the transporting path to the riveting machine, that is to say even before the rivet has been received in the riveting head. A corresponding measurement may be provided on this transporting path, without having to perform a structural modification either on the rivet filling station or on the riveting machine. Similarly possible here is a guidance of the rivet that manages without the hindrances to optical recording such as those in the riveting head itself. Finally, the measurement of the rivet may be carried out without delaying the work of the riveting machine or the rivet filling station, so that an online measurement of the rivet is possible without reducing the cycle times of the processing of the component. As a result, a contactless measurement of the rivet that is as rapid as it is accurate is achieved.

An embodiment specifies particularly relevant geometrical properties of the rivet to be measured.

Various embodiments provide that, if the tolerance criteria are complied with, the rivet is transported further to the riveting machine, whereas, if the tolerance criteria are exceeded, the rivet is transported into a reject position.

Various embodiments provide that a transporting tube provides the transporting path.

Such a transporting tube is particularly suitable for providing a checking section for measuring the rivet.

Various embodiments in turn describes a design of such a checking section of the transporting tube.

Various embodiments relate to an optical recording system for measuring the rivet.

Various embodiments, provided on the transporting path is a measuring chamber, which makes possible the airtight sealing of the checking section and also an optical measurement of the rivet in the checking section.

An embodiment provides a method for checking a rivet, the rivet being transported from a rivet filling station along a transporting path in the direction of a riveting machine during the operation of the riveting machine, wherein in that the rivet is measured on the transporting path for determining a rivet geometry of the rivet.

In various embodiments, the rivet is measured by an optical measuring method, such as a head diameter, a shank diameter, a transition radius, a shank length and/or a head length of the rivet is measured.

In various embodiments, the specific rivet geometry of the rivet is compared with, optionally measured, geometry parameters of the bore for compliance with tolerance criteria.

In various embodiments, if the tolerance criteria are complied with, the rivet is transported to the riveting machine and the rivet is inserted by the riveting machine into a bore on the component and is subjected to a forming process.

In various embodiments, if the tolerance criteria are exceeded, the rivet is transported into a reject position.

In various embodiments, the rivet is transported from the rivet filling station in the direction of the riveting machine by a tube arrangement and in that the tube arrangement has a checking section, through which the transporting path passes, in which checking section the rivet is measured, such as the rivet is stopped in its transport in the checking section for a measuring time.

In various embodiments, the tube arrangement in the checking section has webs for guiding the rivet along the transporting path and slits arranged between the webs for measuring the rivet, such that the slits are arranged substantially oppositely with respect to the transporting path.

In various embodiments, the rivet is measured by a checking arrangement assigned to the checking section, a lighting arrangement of the checking arrangement lighting up the rivet and a camera arrangement of the checking arrangement recording the rivet, in particular recording a backlighting of the rivet by the lighting arrangement.

In various embodiments, the camera arrangement records the rivet three-dimensionally, such that the camera arrangement records the rivet from at least two viewing directions, in particular in that the two viewing directions are aligned substantially orthogonally in relation to one another.

In various embodiments, the camera arrangement records an inclined position of the rivet, such that a rivet geometry, in particular a shank length and a head length, measured on the basis of the recorded inclined position is/are corrected.

In various embodiments, the lighting arrangement is arranged with respect to the rivet substantially opposite the camera arrangement, such that the lighting arrangement and/or the camera arrangement respectively has a telecentric lens for measuring the rivet.

In various embodiments, a measuring chamber is arranged around the checking section to provide an airtight seal, such that the measuring chamber is designed for lighting up the rivet by the lighting arrangement and for recording the rivet by the camera arrangement.

In various embodiments, the measuring chamber is of an at least partially transparent design and the camera arrangement and/or the lighting arrangement is/are arranged outside the measuring chamber.

In various embodiments, the camera arrangement and/or the lighting arrangement is/are arranged at least partially within the measuring chamber.

An embodiment provides a measuring arrangement for checking a rivet for determining a rivet geometry, wherein the measuring arrangement has a tube arrangement for transporting the rivet along a transporting path, which tube arrangement has a checking section and through which checking section the transporting path passes, and also a measuring chamber, which measuring chamber is arranged around the checking section to provide an airtight seal, and has a checking arrangement assigned to the checking section for measuring the rivet.

BRIEF DESCRIPTION OF THE FIGURES

Further details, features, aims and advantages of the present disclosure are explained below on the basis of a drawing, which merely shows exemplary embodiments and in which.

DETAILED DESCRIPTION

Figure 1:
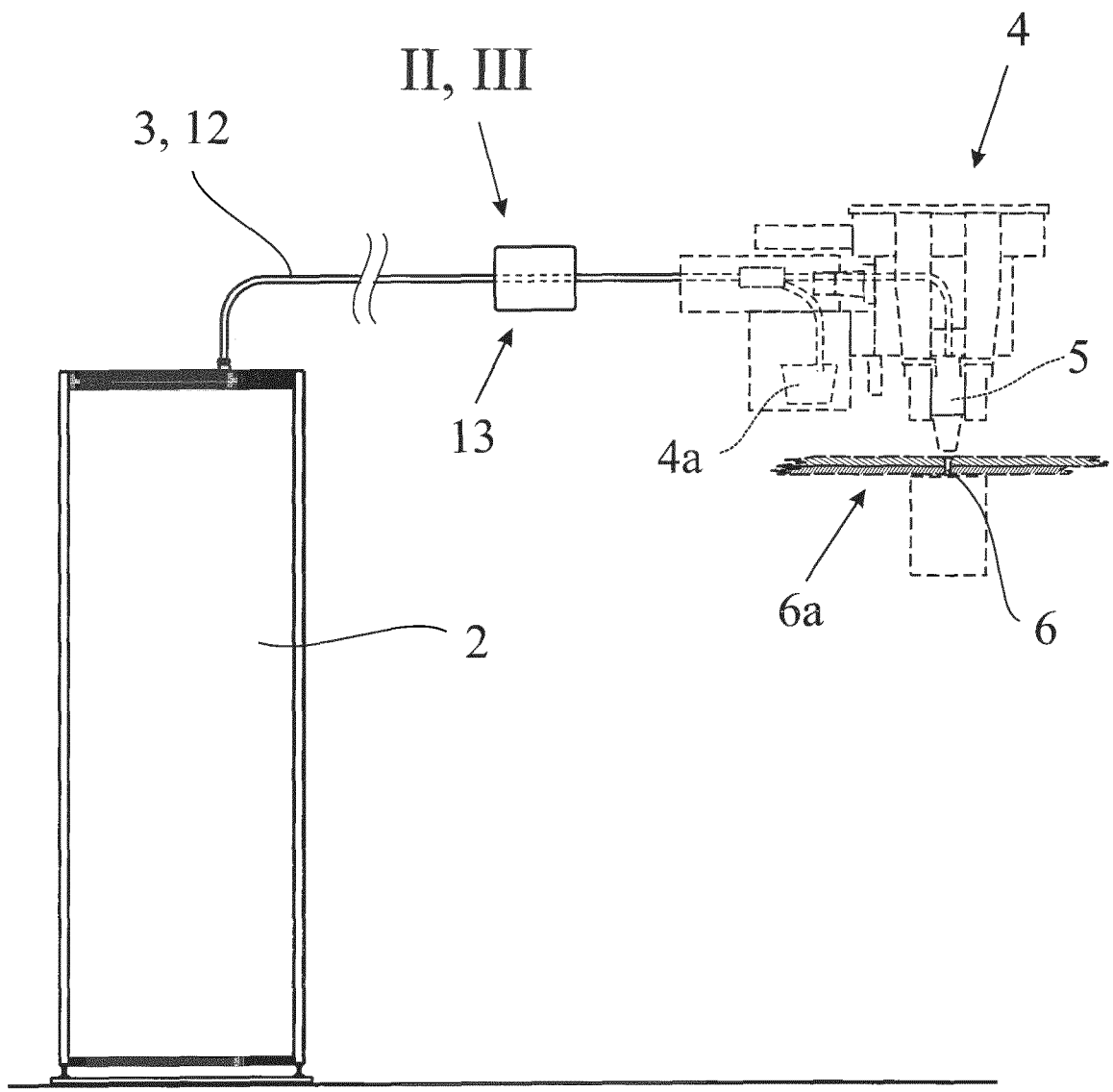
FIG. 1 shows a schematic view of a riveting arrangement for producing riveted connections on structural components for performing the method according to the proposal.

The riveting arrangement that is represented in FIG. 1 is designed for producing riveted connections on structural components, here in particular on structural components of a fuselage or a wing for an aircraft. The method according to the proposal serves for checking a rivet 1, the rivet 1 being transported from a rivet filling station 2 along a transporting path 3 in the direction of a riveting machine 4 during operation of the riveting machine 4. The rivet 1, which is not represented in FIG. 1, can be seen in FIGS. 2, 3 and 4a. The transporting of the rivet 1 may therefore take place without the operation of the riveting machine 4 having to be interrupted.

The rivet filling station 2 may be in principle any desired device that provides a rivet 1 from a store of rivets for transporting along the transporting path 3. The rivet filling station 2 often has a number of rivet containers, each with different types of rivet that can be provided for transporting along the transporting path 3. It is also possible for a number of rivet filling stations 2 to be arranged in such a way that the rivet 1 respectively provided by them is transported at least in certain sections over a common transporting path 3 in the direction of the riveting machine 4. Furthermore, the rivet filling station 2 may also have an individually separating device—not shown here—and a driving device—likewise not represented here—for the rivet 1 on the transporting path 3, which driving device is often based on compressed air. The riveting machine 4 has a riveting head 5, in which the rivet 1 is held before it is inserted into the hole of the bore 6—schematically represented in FIG. 4b—in the component 6a and subjected to a forming process.

The method according to the proposal is characterized in that the rivet 1 is measured on the transporting path 3 for determining a rivet geometry of the rivet 1. The determination of the rivet geometry of the rivet 1 may be restricted to a single geometrical property of the rivet 1 or concern a number of such geometrical properties. In particular, such a rivet geometry is to be understood as meaning any extent of the rivet 1 in any direction and/or any angle of a surface or contour of the rivet 1.

It is provided that the rivet 1 can be measured by an optical measuring method. In various embodiments, measured thereby—as examples of a rivet geometry in the above sense—are a head diameter 7, a shank diameter 8, a transition radius 9, a countersink angle 9a, a shank length 10 and/or a head length 11 of the rivet 1. The corresponding rivet geometries are marked in FIG. 4a. A measuring accuracy can be approximately 3 to 5 micrometers.

It is also provided that the specific rivet geometry of the rivet 1 is compared with geometry parameters of the bore 6 for compliance with tolerance criteria. These geometry parameters of the bore 6 may have been definitively prescribed or analytically calculated. They can be geometry parameters that have been measured and specifically measured at the bore 6.

With respect to the aforementioned rivet geometry, it is often desired that the head diameter 7 corresponds to a countersink diameter 7a of the bore, that the shank diameter 8 is less than the bore diameter 8a, that the transition radius 9 is greater than the bore radius 9b between the countersink and the bore, that the sum of the shank length 10 and the head length 11 is greater than the clamping length 10a and that the head length 11 corresponds to the countersink depth 11a. The tolerance criteria may be prescribed, for instance to what extent and with which tolerances some or all of these requirements are to be met.

It can be provided that, if the tolerance criteria are complied with, the rivet 1 is transported to the riveting machine 4 and the rivet 1 is inserted by the riveting machine 4—specifically by the riveting head 5—into the bore 6 on the component and is subjected to a forming process. The rivet 1 can therefore be used for the bore 6.

It is correspondingly likewise provided that, if the tolerance criteria are exceeded, the rivet 1 is transported into a reject position. In FIG. 1, this reject position is represented by way of example by a scrap container 4a. This transporting into the reject position may comprise either sending the rivet 1—at least provisionally—into the scrap container 4a or returning the rivet 1 into the rivet filling station 2, so that it can be provided again later. Alternatively, the rivet may also be left in a waiting position, in which it allows the processing of the next rivet 1 from the rivet filling station 2 and is only fed to the riveting machine 4 when for example the bore 6 concerned at the time corresponds in its geometry parameters to the rivet geometry of this rivet 1. Until then, the rivet 1 may stay in the reject position. Apart from production-related variations, such exceeding of the tolerance criteria may also be caused by the attachment of swarf or chips to the rivet 1 or by the rivet 1 belonging to a wrong batch.

In various embodiments, and as represented in FIG. 1, the rivet 1 is transported from the rivet filling station 2 in the direction of the riveting machine 4 through a tube arrangement 12. Here, the tube arrangement 12 has a checking section 13, through which checking section 13 the transporting path 3 passes and in which checking section 13 the rivet 1 is measured. It is in this case advantageous if the rivet 1 is stopped in its transport in the checking section 13 for a measuring time. The actual measurement can then therefore take place with a stationary rivet 1. The rivet 1 is often—as already mentioned—driven by compressed air in the tube arrangement 12. The operation—not represented here in its mechanism—of stopping in the checking section 13 and renewed movement can then be brought about in principle in any way desired. If the transporting path 3 serves for transporting a respective rivet 1 from a number of rivet filling stations 2 and has a convergence of respective individual transporting paths, the checking section 13 can be arranged downstream of such a convergence.

In order to ensure both adequate guidance and sufficient optical recordability of the rivet 1 in the checking section 13, it can be provided that the tube arrangement 12 has in the checking section 13 webs 14 for guiding the rivet 1 along the transporting path 3 and slits 15 arranged between the webs 14 for measuring the rivet 1. The slits 15 serve for the measurement of the rivet 1 to the extent that—as a clearance in the material of the tube arrangement 12—they do not impair an optical recording of the rivet 1. In various embodiments—as can be seen from FIGS. 2 and 3—the slits 15 are arranged substantially oppositely with respect to the transporting path 3.

Figure 2:
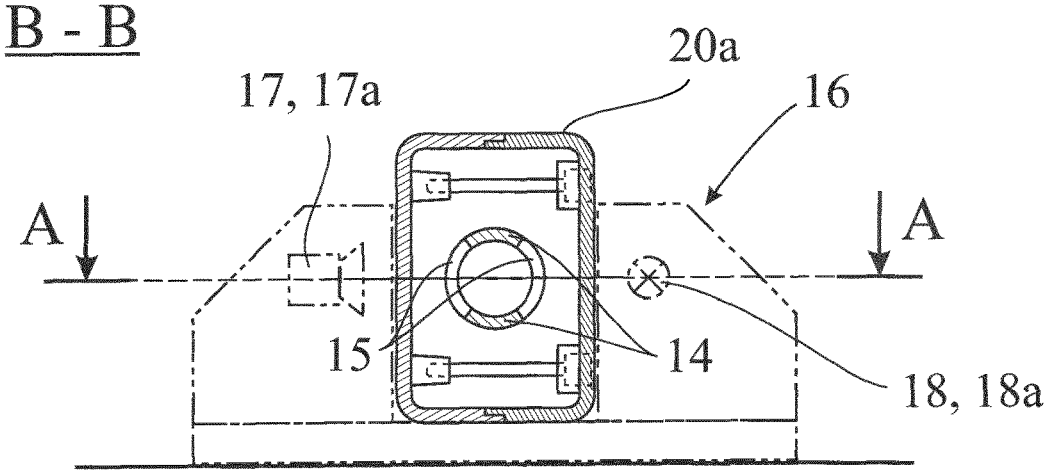
FIG. 2 shows two views of a first exemplary embodiment of a checking arrangement and a measuring chamber for the method according to the proposal.
Figure 2:
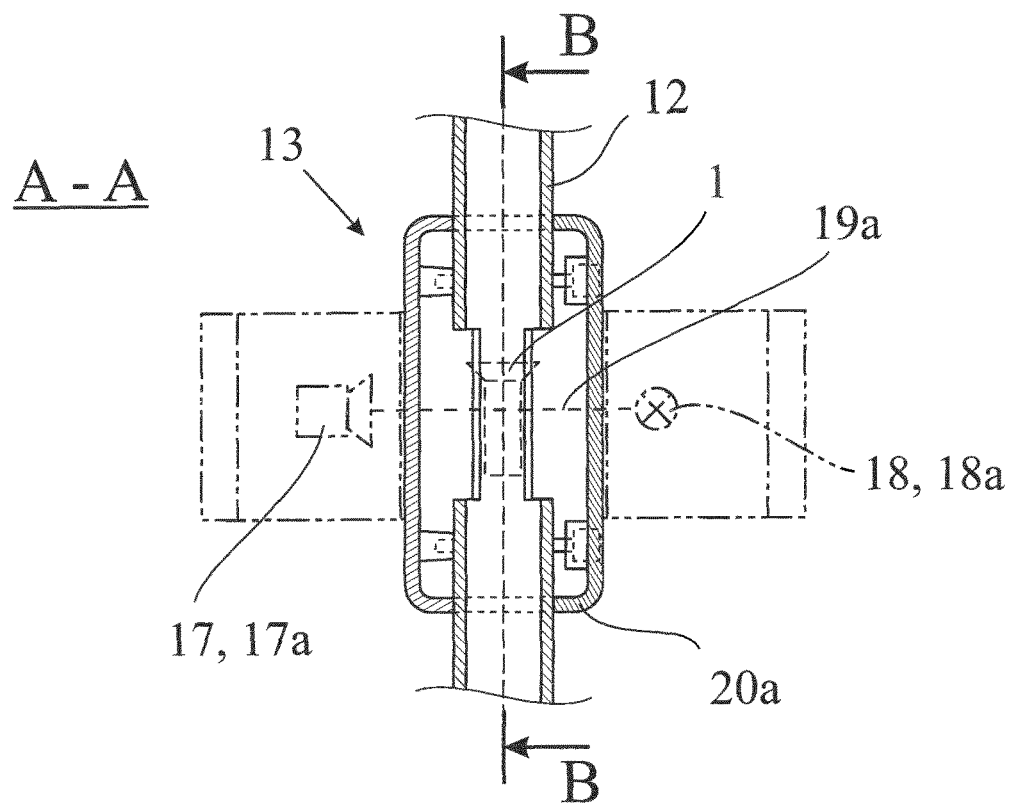
Figure 3:
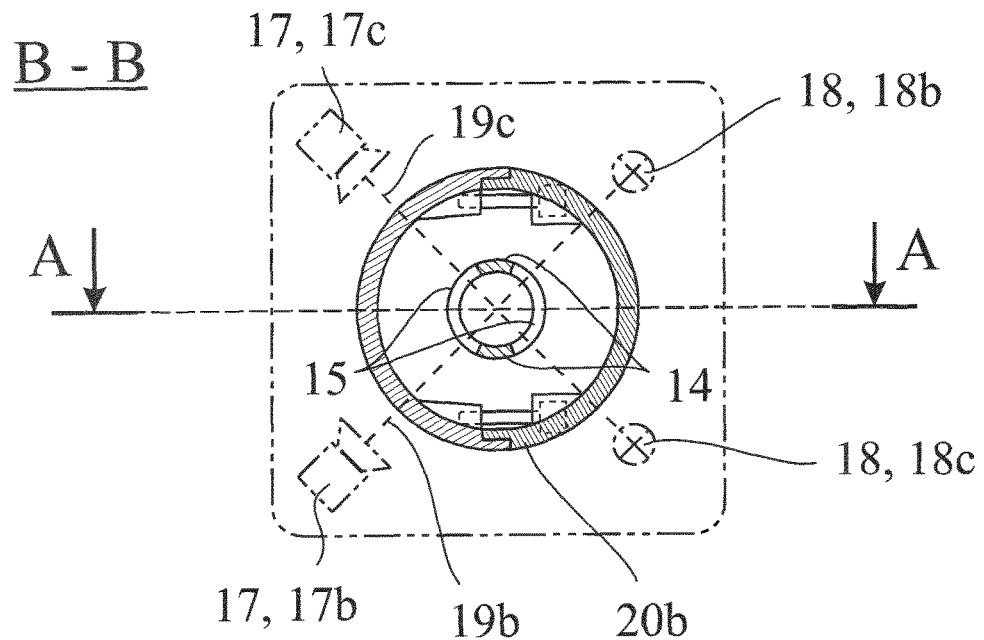
FIG. 3 shows two views of a second exemplary embodiment of a checking arrangement and a measuring chamber for the method according to the proposal and FIGS. 4a-4b respectively show a rivet and a corresponding bore for introducing the rivet for using the method according to the proposal.
Figure 3:
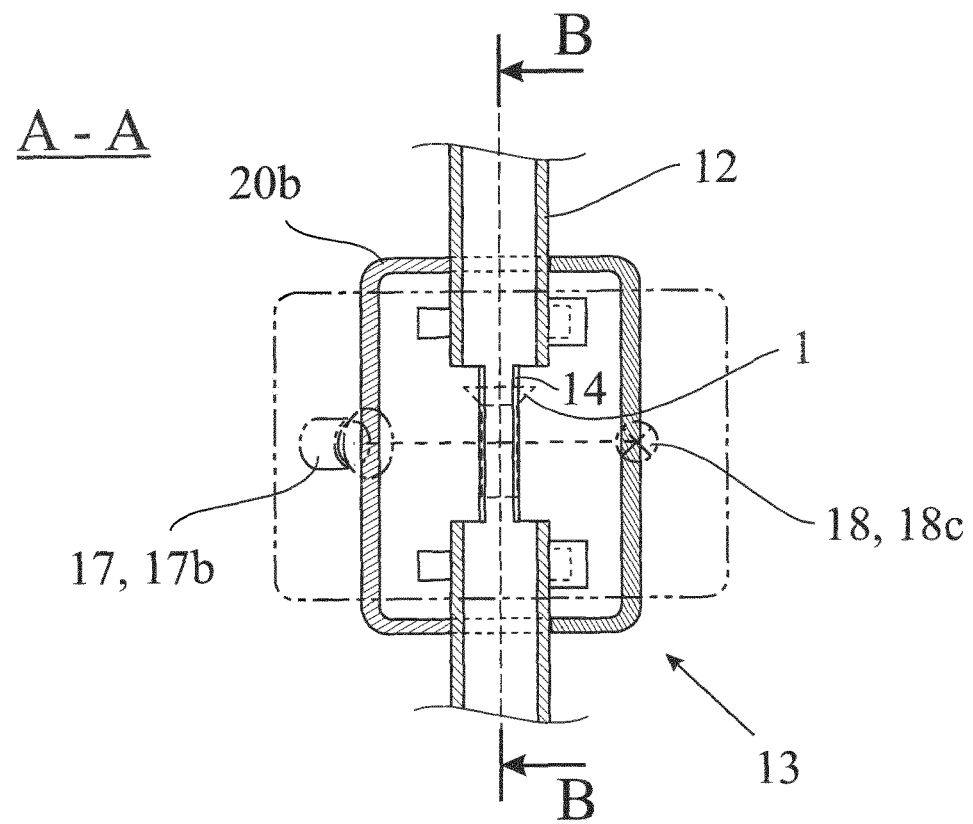
Figure 4:
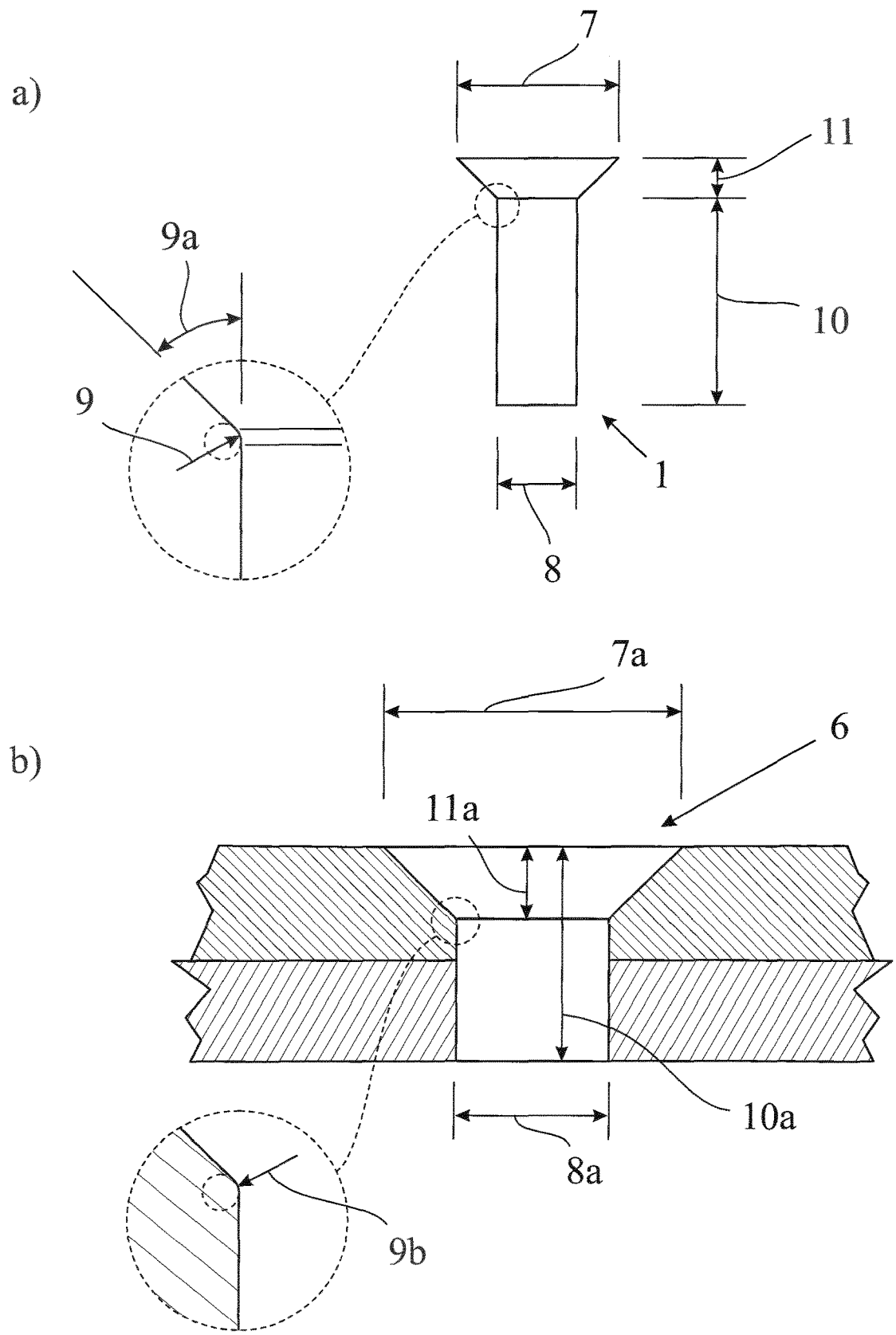

The measurement can take place by the rivet 1 being measured specifically by a checking arrangement 16 assigned to the checking section 13, a lighting arrangement 17 of the checking arrangement 16 lighting up the rivet 1 and a camera arrangement 18 of the checking arrangement 16 recording the rivet 1. Specifically, and as represented in FIGS. 2 and 3, the camera arrangement 18 may record a backlighting of the rivet 1 by the lighting arrangement 17. This principle is also referred to as transparent-light illumination.

In principle, it may be provided that the camera arrangement 18 records the rivet 1 from one viewing direction 19a. This applies for instance to the exemplary embodiment of FIG. 2, according to which a single light source 17a of the lighting arrangement 17 is arranged opposite a single camera 18a of the camera arrangement 18.

To be able to determine the rivet geometry sufficiently accurately, however, it can be provided that the camera arrangement 18 records the rivet 1 three-dimensionally. This can take place—as represented in FIG. 3—by the camera arrangement 18 recording the rivet 1 from at least two viewing directions 19a, b. Here it is found to be advantageous that these two viewing directions 19a, b are aligned substantially orthogonally in relation to one another, as likewise represented in FIG. 3. Specifically in the exemplary embodiment of FIG. 3, two light sources 17b, c of the lighting arrangement 17 are provided, each of which is assigned a camera 18b, c of the camera arrangement 18.

In particular, an undetected inclined position of the rivet 1 may cause errors in the determination of the rivet geometry. To avoid this, it can be provided that the camera arrangement 18 records an inclined position of the rivet 1. This allows in particular a rivet geometry, and especially a shank length 10 and a head length 11, measured on the basis of the recorded inclined position to be corrected.

Specifically with regard to the checking arrangement 16, it is of advantage if the lighting arrangement 17 is arranged with respect to the rivet 1 substantially opposite the camera arrangement 18. If the lighting arrangement 17 has a number of light sources 17b, c and corresponding cameras 18b, c, this opposing arrangement applies to each individual light source 17b, c and the respective camera 18b, c assigned to it, which is likewise represented in FIG. 3. For particularly accurate recording of the rivet 1, it may in this case be provided that the lighting arrangement 17 or the camera arrangement 18 respectively has a telecentric lens for measuring the rivet 1. If both the lighting arrangement 17 and the camera arrangement 18 each have a telecentric lens, the checking arrangement 16 is less sensitive to a displacement of the rivet 16 between the lighting arrangement 17 and the camera arrangement 18, so that a still more accurate measurement is made possible.

It has already been pointed out that on the one hand the rivet 1 is often driven in the tube arrangement 12 by compressed air and on the other hand slits 15 may be provided in the tube arrangement 12 in the checking section. In order that these slits 15 do not impair the driving of the rivet 1, it can be provided that a measuring chamber 20a, b—respectively represented in FIGS. 2 and 3—is arranged around the checking section 13 to provide an airtight seal. The measuring chamber 20a, b can be designed for lighting up the rivet 1 by the lighting arrangement 17 and for recording the rivet 1 by the camera arrangement 18.

On the one hand—according to the represented exemplary embodiments of FIGS. 2 and 3—this can be ensured by the measuring chamber 20a, b being of an at least partially transparent design and the camera arrangement 18 and/or the lighting arrangement 17 being arranged outside the measuring chamber of 20a, b. Consequently, transparent parts of the measuring chamber 20a, b—though this may also apply substantially to the entire measuring chamber 20a, b—allow the light emitted by the lighting arrangement 17 to enter the measuring chamber 20a, b and allow the light that is then recorded by the camera arrangement 18 to leave the measuring chamber 20a, b.

On the other hand, according to a variant that is not represented here, the camera arrangement 18 and/or the lighting arrangement 17 may also be arranged at least partially within the measuring chamber 20a, b, which may obviate the need for the at least partially transparent design of the measuring chamber 20a, b.

A measuring arrangement according to the proposal for checking a rivet 1 for determining a rivet geometry is characterized in that the measuring arrangement has a tube arrangement 12 for transporting the rivet 1 along a transporting path 3, which tube arrangement 12 has a checking section 13 and through which checking section 13 the transporting path 3 passes. The measuring arrangement according to the proposal also has a measuring chamber 20a, b, which measuring chamber 20a, b is arranged around the checking section 13 to provide an airtight seal, and a checking arrangement 16 assigned to the checking section 13 for measuring the rivet 1.

Further designs of the measuring chamber according to the proposal follow from the above refinements of the method according to the proposal and from the features that are relevant for the method.

The invention claimed is:

1. A method for checking a rivet, the rivet being transported from a rivet filling station along a transporting path in the direction of a riveting machine during the operation of the riveting machine,
   wherein the rivet is transported from the rivet filling station in the direction of the riveting machine by a tube arrangement and wherein the tube arrangement comprises a tube and a checking section, wherein the tube and the transporting path continuously pass through the checking section, wherein in the checking section the rivet is measured, wherein a measuring chamber is arranged around the checking section to provide an airtight seal.

2. The method as claimed in claim 1, wherein the rivet is stopped in its transport in the checking section for a measuring time.

3. The method as claimed in claim 1, wherein the rivet is measured by an optical measuring method.

4. The method as claimed in claim 3, wherein a head diameter, a shank diameter, a transition radius, a shank length and/or a head length of the rivet is measured.

5. The method as claimed in claim 1, wherein the specific rivet geometry of the rivet is compared with geometry parameters of a bore for compliance with tolerance criteria.

6. The method as claimed in claim 5, wherein, if the tolerance criteria are complied with, the rivet is transported to the riveting machine and the rivet is inserted by the riveting machine into the bore on the component and is subjected to a forming process.

7. The method as claimed in claim 5, wherein, if the tolerance criteria are exceeded, the rivet is transported into a reject position.

8. The method as claimed in claim 1, wherein the tube arrangement in the checking section has webs for guiding the rivet along the transporting path and slits arranged between the webs for measuring the rivet.

9. The method as claimed in claim 1, wherein the rivet is measured by a checking arrangement assigned to the checking section, a lighting arrangement of the checking arrangement lighting up the rivet and a camera arrangement of the checking arrangement recording the rivet.

10. The method as claimed in claim 8, wherein the slits are arranged substantially oppositely with respect to the transporting path.

11. The method as claimed in claim 9, wherein the lighting arrangement is arranged with respect to the rivet substantially opposite the camera arrangement.

12. The method as claimed in claim 9, wherein the measuring chamber is of an at least partially transparent design and the camera arrangement and/or the lighting arrangement is/are arranged outside the measuring chamber.

13. The method as claimed in claim 9, wherein the camera arrangement and/or the lighting arrangement is/are arranged at least partially within the measuring chamber.

14. The method as claimed in claim 9, wherein the camera arrangement records the rivet three-dimensionally.

15. The method as claimed in claim 14, wherein the camera arrangement records the rivet from at least two viewing directions.

16. The method as claimed in claim 9, wherein the camera arrangement records an inclined position of the rivet.

17. The method as claimed in claim 16, wherein a rivet geometry measured on the basis of the recorded inclined position is/are corrected.

18. A measuring arrangement for checking a rivet for determining a rivet geometry while the rivet is transported from a rivet filling station in the direction of a rivet machine by a tube arrangement, wherein the measuring arrangement has the tube arrangement for transporting the rivet along a transporting path, which tube arrangement has a checking section, wherein the tube arrangement and the transporting path continuously pass through the checking section, and also a measuring chamber, wherein the measuring chamber is arranged around the checking section to provide an airtight seal, and has a checking arrangement assigned to the checking section for measuring the rivet.

* * * * *